(12) United States Patent
Zhu et al.

(10) Patent No.: US 10,354,424 B1
(45) Date of Patent: Jul. 16, 2019

(54) METHOD AND APPARATUS OF DATA DISPLAY

(71) Applicant: ENN SCIENCE AND TECHNOLOGY DEVELOPMENT CO., LTD, Langfang (CN)

(72) Inventors: Bryan Zhu, Holmdel, NJ (US); Zhenqi Zhu, Langfang (CN)

(73) Assignee: ENN SCIENCE AND TECHNOLOGY DEVELOPMENT CO., LTD, Langfang, Hebei (CN)

(*) Notice: Subject to any disclaimer, the term of this patent is extended or adjusted under 35 U.S.C. 154(b) by 0 days.

(21) Appl. No.: 15/894,801

(22) Filed: Feb. 12, 2018

(30) Foreign Application Priority Data

Feb. 1, 2018 (CN) .......................... 2018 1 0103728

(51) Int. Cl.
G06T 11/20 (2006.01)
G06F 17/11 (2006.01)
G06F 16/26 (2019.01)
G06F 16/28 (2019.01)

(52) U.S. Cl.
CPC ............ *G06T 11/206* (2013.01); *G06F 16/26* (2019.01); *G06F 16/287* (2019.01); *G06F 17/11* (2013.01)

(58) Field of Classification Search
None
See application file for complete search history.

(56) References Cited

U.S. PATENT DOCUMENTS

2015/0294118 A1* 10/2015 Parker .................. G06F 21/606
726/26

* cited by examiner

*Primary Examiner* — Michelle Chin
(74) *Attorney, Agent, or Firm* — Ladas & Parry, LLP

(57) ABSTRACT

A method and an apparatus of data display, includes: obtaining a plurality of eigen data of a product, and classifying the obtained plurality of eigen data as classified eigen data; performing different standardization processes on the classified eigen data according to the classifications as processed eigen data; displaying the processed eigen data graphically.

5 Claims, 2 Drawing Sheets

METHOD AND APPARATUS OF DATA DISPLAY

This application claims priority to Chinese Patent Application No. 201810103728.5, filed on Feb. 1, 2018, titled "A METHOD AND AN APPARATUS OF DATA DISPLAY", which is incorporated herein by reference in its entirety.

TECHNICAL FIELD

The present disclosure relates to a field of data processing technology, more particularly, to a method and an apparatus of data display.

BACKGROUND

With the development of science and technology, more and more new products appear in people's lives. These products include tangible objects, intangible services, ideas, or a combination of them. People often need to get a lot of information about a product before purchasing it to choose from to satisfy their needs.

During the process of obtaining the information of the related products, the inventor finds that at least the following problems exist in the prior art: on the one hand, the existing products are more scattered in the basic data related to the products. For example, some of the information is in the product specification Some information is displayed in the product package or some information is displayed on the product appearance mark. On the other hand, when the product information is displayed in a two-dimension code, it is usually necessary to scan the two-dimensional code to understand the product related information. The presentation of product information above makes the way for people to get product information is not visualized and decentralized.

SUMMARY

A first aspect, an embodiment of the disclosure provides a method of data display, which includes:

obtaining a plurality of eigen data of a product, and classifying the obtained plurality of eigen data as classified eigen data, wherein the eigen data refer to the data representing the characteristics of the product itself;

performing different standardization processes to generate processed eigen data on the classified eigen data according to the classifications, wherein the standardization processes refer to eliminating the dimension features between the eigen data so as to make the eigen data comparable;

displaying the processed eigen data graphically.

In an optional implementation, the classification obtained in the step of classifying the obtained plurality of eigen data as classified eigen data comprises: quantifiable parameter, attributed and non-quantifiable parameter, and non-attributed and non-quantifiable parameter; wherein, the quantifiable parameter refers to a parameter whose characteristic can be directly represented by a specific numerical value; the attributed and non-quantifiable parameter refers to a parameter whose characteristic cannot be directly represented by a specific numerical value, but can be represented by a numerical value gotten by general data processing; and the non-attribute and non-quantifiable parameter refers to a parameter whose characteristic neither can be directly represented by a specific numerical value nor can be represented by a numerical value gotten by general data processing.

In an optional implementation, the step of performing different standardization processes on the classified eigen data according to the classifications to get the processed eigen data comprises:

using a standardized normalization process or a zero-mean normalization process to process the quantifiable parameter;

using a Min-Max normalization process to process the attributed and non-quantifiable parameter; and using a qualitative normalization process to process the non-attributed and non-quantifiable parameter.

In an optional implementation, the process of using the standardized normalization process to the quantifiable parameter comprises:

determining a first value of the quantifiable parameter; and according to formula $$y_i = \frac{x_i}{\sum_{1}^{n} x_i^2},$$

the first value of the quantifiable parameter is processed to obtain a second value of the quantifiable parameter, where $x_i$ is the first value of the quantifiable parameter, $y_i$ is the second value of the quantifiable parameter, i is a natural number greater than or equal to 1 and less than or equal to n, and, n is the number of data of the sample where the first value is and which is a natural number greater than 1;

the process of using the zero-mean normalization process to process the quantifiable parameter comprises:

determining a first value of the quantifiable parameter; and according to formula $$y_i = \frac{x_i - \bar{x}}{s},$$

the first value of the quantifiable parameter is processed to obtain a second value of the quantifiable parameter, where $x_i$ is the first value of the quantifiable parameter, $y_i$ is the second value of the quantifiable parameter, $\bar{x}$ is the mean value of all the data in the sample where the first value is, s is the standard deviation of all data of the sample where the first value is, i is a natural number greater than or equal to 1 and less than or equal to n, and, n is the number of data of the sample where the first value is and which is a natural number greater than 1;

the process of using the Min-Max normalization process to process the attributed and non-quantifiable parameter comprises:

determining a first value of the attributed and non-quantifiable parameter firstly, and according to the formula $$y_i = \frac{x_i - \min\{x_j\}}{\max\{x_j\} - \min\{x_j\}},$$

the first value of the attributed and non-quantifiable parameter is processed to obtain a second value of the attributed and non-quantifiable parameter, where $x_i$ is the first value of the attributed and non-quantifiable parameter, $y_i$ is the second value of the attributed and non-quantifiable parameter, $\max\{x_j\}$ is the maximum value of all the data in the sample where the first value is, $\min\{x_j\}$ is the minimum value of all the data in the sample where the first value is, i is a natural number greater than or equal to 1 and less than or equal to, j is a natural number greater than or equal to 1 and less than or equal to n, and, n is the number of data of the sample where the first value is and is a natural number greater than 1;

the process of using the qualitative normalization process to process the non-attributed and non-quantifiable parameter comprises:

dividing an interval from 0 to 1 into at least two nodes, and each of the at least two nodes represents a different meaning and each node is set to a different value; and, the meaning of the non-attributed and non-quantifiable parameter is first determined, and then according to the meaning, it is known which node the non-attributed and non-quantifiable parameter is located, so as to obtain the value corresponding to the node.

In an optional implementation, the step of displaying the processed eigen data graphically comprises: graphic graphified by the processed eigen data on the appearance or package of the product is displayed; or the processed eigen data is transmitted to a display screen so as to display a graphic graphified by the processed eigen data on the display screen.

A second aspect, an embodiment of the disclosure provides an apparatus of data display, which includes:

an obtainer; configured to obtain a plurality of eigen data of a product, wherein the eigen data refer to the data representing the characteristics of the product itself;

a classifier, configured to classify a plurality of eigen data obtained by the obtainer;

an normalization processor, configured to perform different normalization processes on the eigen data classified by the classifier according to the classifications, wherein the normalization processes refer to eliminating the dimension features between the eigen data so as to make the eigen data comparable;

a display, configured to graphically display the eigen data processed by the normalization processor.

In an optional implementation, the classification comprises: quantifiable parameter, attributed and non-quantifiable parameter, and non-attributed and non-quantifiable parameter; wherein, the quantifiable parameter refers to a parameter whose characteristic can be directly represented by a specific numerical value; the attributed and non-quantifiable parameter refers to a parameter whose characteristic cannot be directly represented by a specific numerical value, but can be represented by a numerical value gotten by general data processing; and the non-attribute and non-quantifiable parameter refers to a parameter whose characteristic neither can be directly represented by a specific numerical value nor can be represented by a numerical value gotten by general data processing.

In an optional implementation, the normalization processor is configured to: use a standardized normalization process or a zero-mean normalization process to process the quantifiable parameter; use a Min-Max normalization process to process the attributed and non-quantifiable parameter; and use a qualitative normalization process to process the non-attributed and non-quantifiable parameter.

In an optional implementation, the normalization processor is configured to:

in the case of using the standardized normalization process, determine a first value of the quantifiable parameter, then according to the formula $$y_i = \frac{x_i}{\sum_1^n x_i^2},$$

process the first value of the quantifiable parameter to obtain a second value of the quantifiable parameter, where $x_i$ is the first value of the quantifiable parameter, $y_i$ is the second value of the quantifiable parameter, i is a natural number greater than or equal to 1 and less than or equal to n, and, n is the number of data of the sample where the first value is and which is a natural number greater than 1;

in the case of using the zero-mean normalization process, determine a first value of the quantifiable parameter, then according to the formula $$y_i = \frac{x_i - \bar{x}}{s},$$

process the first value of the quantifiable parameter to obtain a second value of the quantifiable parameter, where $x_i$ is the first value of the quantifiable parameter, $y_i$ is the second value of the quantifiable parameter, $\bar{x}$ is the mean of all the data in the sample where the first value is, s is the standard deviation of all data of the sample where the first value is, i is a natural number greater than or equal to 1 and less than or equal to n, and, n is the number of data of the sample where the first value is and which is a natural number greater than 1;

in the case of using the Min-Max normalization process, determine a first value of the attributed and non-quantifiable parameter, then according to the formula $$y_i = \frac{x_i - \min\{x_j\}}{\max\{x_j\} - \min\{x_j\}},$$

process the first value of the attributed and non-quantifiable parameter to obtain a second value of the attributed and non-quantifiable parameter, where $x_i$ is the first value of the attributed and non-quantifiable parameter, $y_i$ is the second value of the attributed and non-quantifiable parameter, $\max\{x_j\}$ is the maximum value of all the data in the sample where the first value is, $\min\{x_j\}$ is the minimum value of all the data in the sample where the first value is, i is a natural number greater than or equal to 1 and less than or equal to n, j is a natural number greater than or equal to 1 and less than or equal to n, and, n is the number of data of the sample where the first value is and which is a natural number greater than 1;

in the case of using the qualitative normalization process; divide the interval from 0 to 1 into at least two nodes, set each of the at least two nodes represents a different meaning and each node to a different value, and determine the meaning of the non-attributed and non-quantifiable parameter first, then according to the meaning, obtain which node the non-attributed and non-quantifiable parameter is located, so as to obtain the value corresponding to the node.

In an optional implementation, the display is configured to: display a graphic graphified by the processed eigen data on the appearance or package of the product; or transmit the processed eigen data to a display screen so as to display a graphic graphified by the processed eigen data on the display screen.

A third aspect of the disclosure provides an electronic equipment, which comprises a processor and a memory. The memory stores one or more programs, and the one or more programs comprise computer-executable instructions. When the electronic device is running, the processor executes the computer-executable instructions stored in the memory, so that the electronic device executes the method of data display described in any one of the first aspect and various optional implementations.

A fourth aspect of the disclosure provides a computer-readable storage medium, having computer programs stored thereon, and the computer programs being loaded on a computer and executed by the computer to cause the computer to execute the method of data display described in any one of the above first aspect and various optional implementations thereof.

A fifth aspect of the disclosure provides a computer program product which, when executed by a processor, performs the method of data display described in any one of the above first aspect and various optional implementations.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure; and a person of ordinary skill in the art can obtain other drawings according to those drawings without paying any creative effort.

DETAILED DESCRIPTION

The technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

The method and apparatus of data display provided by the embodiments of the present disclosure enable the information of a product to be displayed visually and centrally, by a plurality of eigen data of a product being obtained and the obtained plurality of eigen data being classified, and different normalization processes being performed for the classified eigen data according to the classifications, and the processed data being graphically displayed.

Figure 1:
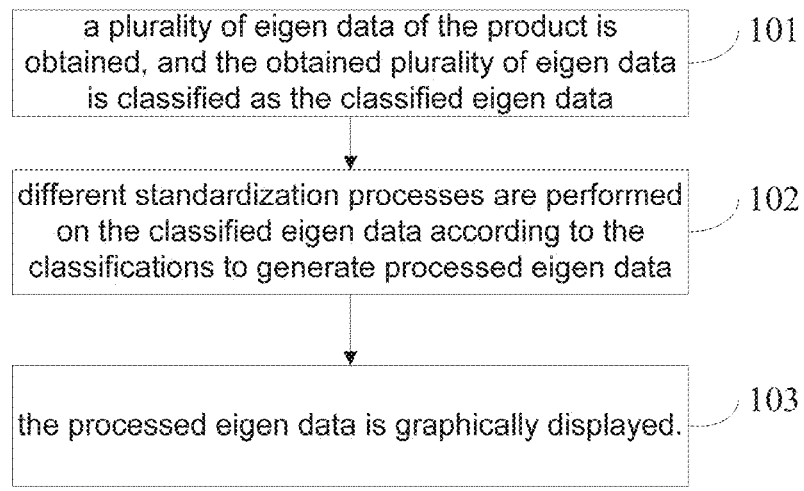
FIG. 1 is a flow diagram of a method of data display provided by an embodiment of the present disclosure.

An embodiment of the present disclosure provides a method of data display, which is applicable to electronic devices such as servers, terminal devices, and the like. As shown in FIG. 1, the method includes the following steps.

Step 101: a plurality of eigen data of the product is obtained, and the obtained plurality of eigen data is classified as the classified eigen data.

In this step, the product is an electronic product such as a mobile phone, a computer, or a virtual product such as software or network tool, or an intangible product such as service or idea, or any combination of the above electronic product, virtual product and intangible product. The product may also be other types of products, which is not limited in this embodiment of the present disclosure.

In this step, the eigen data refer to the data representing the characteristics of the product itself. The eigen data can be one-dimensional or multi-dimensional indicator data. The eigen data includes, but is not limited to: product type, product ranking, life cycle, function, quality and operation and maintenance; maintenance cost and life cycle cost; usage environmental indicators; user friendliness degree and accessories availability indicators; configuration of the technical staff; manufacturer strength, reputation, service quality and speed ranking; product history, product replacement cycles and more.

Optionally, after the plurality of eigen data of the product is obtained, a corresponding digital list can be set for the product. The digital list is used to store the eigen data of the product, and the digital list may be implemented in a form of a table. for example, as shown in Table 1, the digital list shows the eigen data of various mobile brands (only illustratively).

TABLE 1

| Mobile Brand | life cycle (unit: year) | product ranking |
|---|---|---|
| Apple | 10 | 1 |
| HUAWEI | 8 | 3 |
| Coolpad | 5 | 12 |

The digital list can be open to the user so that the user can modify or maintain the data in the digital list so as to increase the credibility of the data in the digital list. Accordingly, the information in the embodiments of the present disclosure may further include but are not limited to, statistic data and statisticator ID of a digital list; product quality and product usage frequency in a digital list; correction historical data and corrector ID in a digital list; a digital list of replaced product; a digital list of potential replaced product or the other type of holographic digital list designed by certain rules and standards.

In an optional implementation, the electronic equipment obtains the plurality of eigen data of the product by means of web crawler, data cloud platform crawling, manual entry, and the like.

Optionally, after the plurality of eigen data of the product is obtained, they may be pre-processed. The pre-processing includes data cleaning and data conversion. The data cleaning is to re-examine and check the data, the purpose is to correct the errors in the data. The data conversion refers to convert the data according to certain rules, such as square root conversion, logarithm conversion.

Moreover, after the plurality of eigen data of the product is obtained, the obtained plurality of eigen data are classified. In a specific embodiment of the present disclosure, the classifications includes: quantifiable parameter, attributed and non-quantifiable parameter, and non-attributed and non-quantifiable parameter.

The quantifiable parameter refers to a parameter whose characteristic can be directly represented by a specific numerical value, for example, a parameter such as rank, cycle, cost, and the like which can express a characteristic by giving a specific numerical value thereof. The attributed and non-quantifiable parameter refers to a parameter whose characteristic cannot be directly represented by a specific numerical value, but can be represented by a numerical value gotten by general data processing, for example, the parameter such as reputation, quality, strength and other parameters. The non-attribute non-quantifiable parameter refers to a parameter whose characteristic neither can be directly represented by a specific numerical value nor can be represented by a numerical value gotten by general data processing, for example, the parameter such as statisticator ID of a digital list, replaceability.

Step 102: different standardization processes are performed to generate processed eigen data on the classified eigen data according to the classifications.

In this step, the standardization processes refer to eliminating the dimension features between the eigen data so as to make the eigen data comparable.

In a specific embodiment of the present disclosure, in a situation that the eigen data is classified into the quantifiable parameter, the attributed and non-quantifiable parameter, and the non-attributed and non-quantifiable parameter, the step 102 may specifically include the following cases.

In a first case, standardized normalization process or zero-mean normalization process is applied to the quantifiable parameter.

In a second case, Min-Max normalization process is applied to the attributed and non-quantifiable parameter.

In a third case, qualitative normalization process is applied to the non-attributed and non-quantifiable parameter.

For the three cases above, furthermore, in a specific embodiment of the present disclosure, the standardization processes may be implemented in the following manners.

In the first case, in a situation that the method of standardized normalization is applied to the quantifiable parameter, a first value of a quantifiable parameter is determined. Since the first value is a numerical value directly representing the characteristic of the quantifiable parameter, this value is determined directly without any calculation or treatment. For example, the numerical value of the lifecycle of a brand phone is obtained directly from the existing database or from technical staff based on past maintenance results. Then, according to the formula $$y_i = \frac{x_i}{\sqrt{\sum_1^n x_i^2}},$$

the first value of the quantifiable parameter is processed to obtain a second value of the quantifiable parameter, where $x_i$ is the first value of the quantifiable parameter, $y_i$ is the second value of the quantifiable parameter, i is a natural number greater than or equal to 1 and less than or equal to n, and, n is the number of data of the sample where the first value is and is a natural number greater than 1. Obviously, the second value of the quantifiable parameter obtained by the above formula is in the interval of 0 to 1.

Taking the life cycle of a variety of mobile brands for example (only illustratively), Table 2 shows the first value and the second value of the quantifiable parameter (i.e., life cycle), where n=3. From Table 2 it can be seen that the mobile brands are Apple, HUAWEI and Coolpad. The first values are 10, 8 and 5, respectively, before the standardized normalization is performed. The second values are 0.053, 0.042 and 0.026, respectively, after the standardized normalization is performed by using the above formula.

TABLE 2

| Mobile Brand | life cycle | |
|---|---|---|
| | before performing the standardized normalization (unit: year) | after performing the standardized normalization with the use of the above formula |
| Apple | 10 | 0.053 |
| HUAWEI | 8 | 0.042 |
| Coolpad | 5 | 0.026 |

In the first case, in a situation that the method of zero-mean normalization is applied to the quantifiable parameter, a first value of a quantifiable parameter is determined. Then, according to the formula $$y_i = \frac{x_i - \bar{x}}{s},$$

the first value of the quantifiable parameter is processed to obtain a second value of the quantifiable parameter, where $x_i$ is the first value of the quantifiable parameter, $y_i$ is the second value of the quantifiable parameter, $\bar{x}$ is the mean of all the data in the sample where the first value is, s is the standard deviation of all data of the sample where the first value is, i is a natural number greater than or equal to 1 and less than or equal to n, and, n is the number of data of the sample where the first value is and is a natural number greater than 1.

Taking the life cycle of a variety of mobile brands for example (only illustratively), Table 3 shows the first value and the second value of the quantifiable parameter (i.e., life cycle), where n=3. From Table 3 it can be seen that the mobile brands are Apple, HUAWEI and Coolpad. The first values are 10, 8, and 5, respectively, before the zero-mean normalization is performed. The second values are 0.655, 0.093, −0.750, respectively, after the zero-mean normalization is performed by using the above formula.

TABLE 3

| Mobile Brand | life cycle | |
|---|---|---|
| | before performing the zero-mean normalization (unit: year) | after performing the zero-mean normalization with the use of the above formula |
| Apple | 10 | 0.053 |
| HUAWEI | 8 | 0.042 |
| Coolpad | 5 | 0.026 |

It can be understood that, the above formula is normal distribution, if the data obtained after the method of zero-mean normalization is a value less than zero, the normal distribution may be properly shifted along the positive direction of X axis, so that all data obtained is greater than or equal to zero after the zero-mean normalization is performed.

In the second case, in a situation that the method of Min-Max normalization is applied to the attributed and non-quantifiable parameter, a first value of the attributed and non-quantifiable parameter is first determined, and the first value may be obtained according to the score result. For example, the quality of a mobile phone product is set with an evaluation set {best, better, average, worse and worst}. According to the evaluation set, it is given that an optimal evaluation corresponds to a value of 5, a better evaluation corresponds to a value of 4, an average evaluation corresponds to a value of 3, a worse evaluation corresponds to a value of 2, and a worst evaluation corresponds to a value of 1. In this case, when the evaluation of a brand phone is the best, its first value is 5. Then, according to the formula $$y_i = \frac{x_i - \min\{x_j\}}{\max\{x_j\} - \min\{x_j\}},$$

the first value of the attributed and non-quantifiable parameter is processed to obtain a second value of the attributed and non-quantifiable parameter, where $x_i$ is the first value of the attributed and non-quantifiable parameter, $y_i$ is the second value of the attributed and non-quantifiable parameter, $\max\{x_j\}$ is the maximum value of all the data in the sample where the first value is, $\min\{x_j\}$ is the minimum value of all the data in the sample where the first value is, i is a natural number greater than or equal to 1 and less than or equal to is a natural number greater than or equal to 1 and less than or equal to n, and, n is the number of data of the sample where the first value is and is a natural number greater than 1.

Taking the quality of a variety of mobile brands for example (only illustratively), Table 4 shows the first value and the second value of the non-attributed and non-quantifiable parameter (i.e., quality), where n=3. From Table 4 it can be seen that, the mobile brands are Apple, HUAWEI and Coolpad. The first values are 5, 4 and 3, respectively, before the Min-Max normalization is performed. The second values are 1, 0.5, 0, respectively, after the Min-Max normalization is performed by using the above formula.

TABLE 4

| Mobile Brand | quality | |
|---|---|---|
| | before performing the Min-Max normalization | after performing the Min-Max normalization with the use of the above formula |
| Apple | 5 | 1 |
| HUAWEI | 4 | 0.5 |
| Coolpad | 3 | 0 |

In the third case, in a situation that the method of qualitative normalization is applied to the non-attributed and non-quantifiable parameter, the interval from 0 to 1 is divided into at least two nodes, for example, two nodes of 0 and 1, or three nodes of 0, 0.5 and 1, or more nodes. Each of the at least two nodes represents a different meaning and each node is set to a different value. For example, all handsets have ID for a mobile phone brand, some handsets have ID for another mobile phone brand, and none of handsets have ID for another mobile phone brand. Therefore, when all handsets have ID, the corresponding node of this mobile brand has a value of 1. When some handsets have ID, the corresponding node of this mobile brand has a value of 0.5, and if none of handsets have ID, the corresponding node of this mobile brand has a value of 0. Therefore, the meaning of the non-attributed and non-quantifiable parameter is first determined, and then according to the meaning, it is known which node the non-attributed and non-quantifiable parameter is located, so as to obtain the value corresponding to the node.

Taking the ID of a variety of mobile brands for example (only illustratively), Table 5 shows the meaning and the value of the non-attributed and non-quantifiable parameter (i.e., ID), From Table 5 it can be seen that before the qualitative normalization process, the first, the second and the third mobile brands respectively mean that all have ID, some have ID, and none have ID. The values are 1, 0.5, 0 respectively, after the qualitative normalization is performed by using the above formula.

TABLE 5

| Mobile Brand | ID | |
|---|---|---|
| | before performing the qualitative normalization | after performing the qualitative normalization with the use of the above formula |
| a first mobile brand | all have | 1 |
| a second mobile brand | some have | 0.5 |
| a third mobile brand | none have | 0 |

Step 103: the processed eigen data is graphically displayed.

Figure 2:
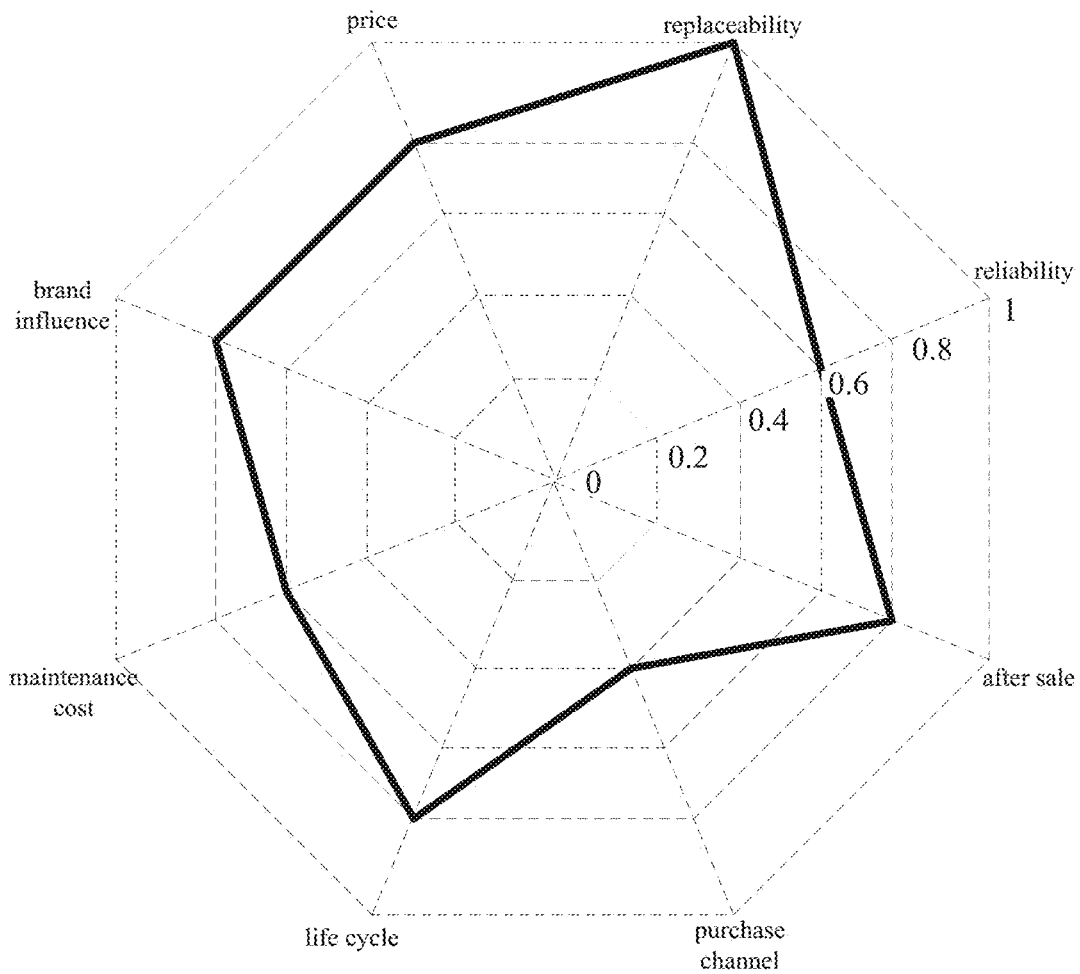
FIG. 2 is an exemplary schematic diagram of a method of data display provided by an embodiment of the present disclosure.

In this step, the processed eigen data can be placed in a same chart for centralized display. Illustratively, the radar chart can be used for centralized display. As shown in FIG. 2, taking the various parameters of a certain mobile brand for example, the coordinate axes of different parameters radiate outwards from the center. The data points which are farther away from the center indicate that the better the value in the corresponding parameter of the mobile phone is. Taking the coordinate axis corresponding to reliability for example, the nodes on the coordinate axis from inside to outside are 0, 0.2, 0.4, 0.6, 0.8, and 1 successively.

Optionally, in a specific embodiment of the present disclosure, step 103 specifically includes the following content.

A graphic graphified by the processed eigen data is displayed on the appearance or package of the product; or the processed eigen data is transmitted to a display screen to display a graphic graphified by the processed eigen data on the display screen. Further, the display screen can be set on the product for data display.

It should be noted that, for the above data gotten from the eigen data through different standardization processes, an uniform normalization may be performed, so as to obtain more regular data, so that the graphical displaying is more visualized and clearer.

The embodiments of the present disclosure provide a method of data display, though a plurality of eigen data of the product is obtained, the obtained plurality of eigen data are classified, different normalization processes are performed respectively on the classified eigen data according to the classifications, and the processed eigen data is graphically displayed, so that the information contained in the product can be displayed visually and centrally.

Figure 3:
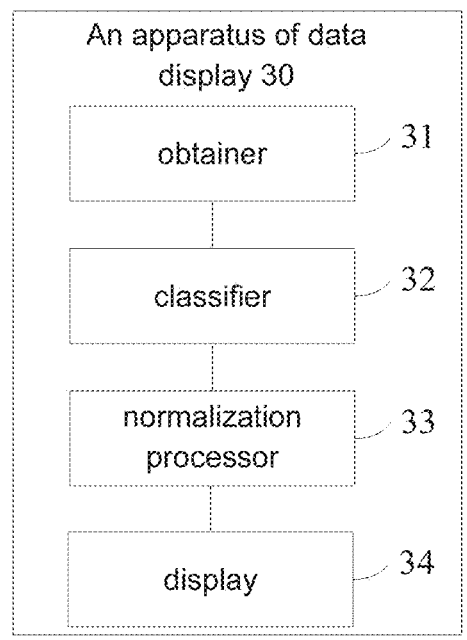
FIG. 3 is a schematic structural diagram of an apparatus of data display provided by an embodiment of the present disclosure.

An embodiment of the present disclosure provide an apparatus of data display 30 which may be disposed within or attached to an electronic device. As shown in FIG. 3, the apparatus 30 includes an obtainer 31, a classifier 32, a normalization processor 33, and a display 34.

The obtainer 31 is configured to obtain a plurality of eigen data of the product, wherein the eigen data refer to the data representing the characteristics of the product itself.

The classifier 32 is configured to classify a plurality of eigen data obtaind by the obtainer 31.

The normalization processor 33 are configured to perform different normalization processes on the eigen data classified by the classifier 32 according to the classifications, and the normalization processes refer to eliminating the dimension features between the eigen data so as to make the eigen data comparable.

The display 34 is configured to graphically display the eigen data processed by the normalization processor 33.

The embodiment of the present disclosure provides an apparatus of data display 30. In this apparatus, the obtainer 31 obtains a plurality of eigen data of a product and the classifier 32 classifies a plurality of eigen data obtained by the obtainer; the normalization processor 33 perform different normalization processes on the eigen data classified by the classifier 32 according to the classifications. The display 34 graphically displays the eigen data processed by the normalization processor 33. As a result, the information contained in the product can be displayed visually and centrally.

Optionally, in a specific embodiment of the present disclosure, the above classifications includes a quantifiable parameter, an attributed and non-quantifiable parameter, and a non-attributed and non-quantifiable parameter, wherein, the quantifiable parameter refers to a parameter whose characteristic can be directly represented by a specific numerical value; the attributed and non-quantifiable parameter refers to a parameter whose characteristic cannot be directly represented by a specific numerical value, but can be represented by a numerical value gotten by general data processing; and, the non-attribute non-quantifiable parameter refers to a parameter whose characteristic neither can be directly represented by a specific numerical value nor can be represented by a numerical value gotten by general data processing.

Optionally, in a specific embodiment of the present disclosure, the normalization processor 33 is configured to use standardized normalization process or zero-mean normalization process on the quantifiable parameters, use Min-Max normalization process on the attributed and non-quantifiable parameter, and use qualitative normalization on the non-attributed and non-quantifiable parameter.

Optionally, in a specific embodiment of the present disclosure, the normalization processor 33 is configured to have the following functions.

In the case of using the standardized normalization process, a first value of the quantifiable parameter is determined, then according to the formula $$y_i = \frac{x_i}{\sum_{1}^{n} x_i^2},$$

the first value of the quantifiable parameter is processed to obtain a second value of the quantifiable parameter, where $x_i$ is the first value of the quantifiable parameter, $y_i$ is the second value of the quantifiable parameter, i is a natural number greater than or equal to 1 and less than or equal to n, and, n is the number of data of the sample where the first value is and is a natural number greater than 1.

In the case of using the zero-mean normalization process, a first value of the quantifiable parameter is determined, then according to the formula $$y_i = \frac{x_i - \bar{x}}{s},$$

the first value of the quantifiable parameter is processed to obtain a second value of the quantifiable parameter, where $x_i$ is the first value of the quantifiable parameter, $y_i$ is the second value of the quantifiable parameter, $\bar{x}$ is the mean of all the data in the sample where the first value is, s is the standard deviation of all data of the sample where the first value is, i is a natural number greater than or equal to 1 and less than or equal to n, and, n is the number of data of the sample where the first value is and is a natural number greater than 1.

In the case of using the Min-Max normalization process, a first value of the attributed and non-quantifiable parameter is determined, then according to the formula $$y_i = \frac{x_i - \min\{x_j\}}{\max\{x_j\} - \min\{x_j\}},$$

the first value of the attributed and non-quantifiable parameter is processed to obtain a second value of the attributed and non-quantifiable parameter, where $x_i$ is the first value of the attributed and non-quantifiable parameter, $y_i$ is the second value of the attributed and non-quantifiable parameter, $\max\{x_j\}$ is the maximum value of all the data in the sample where the first value is, $\min\{x_j\}$ is the minimum value of all the data in the sample where the first value is, i is a natural number greater than or equal to 1 and less than or equal to n, j is a natural number greater than or equal to 1 and less than or equal to n, and, n is the number of data of the sample where the first value is and is a natural number greater than 1.

In the case of using the qualitative normalization process, the interval from 0 to 1 is divided into at least two nodes. Each of the at least two nodes represents a different meaning and each node is set to a different value, and the meaning of the non-attributed and non-quantifiable parameter is first determined, and then according to the meaning, it is known which node the non-attributed and non-quantifiable parameter is located, so as to obtain the value corresponding to the node.

Optionally, in a particular embodiment of the present disclosure, the display 34 is configured to:

display a graphic graphified by the processed eigen data on the appearance or package of the product; or transmit the processed eigen data to a display screen so as to display a graphic graphified by the processed eigen data on the display screen.

Figure 4:
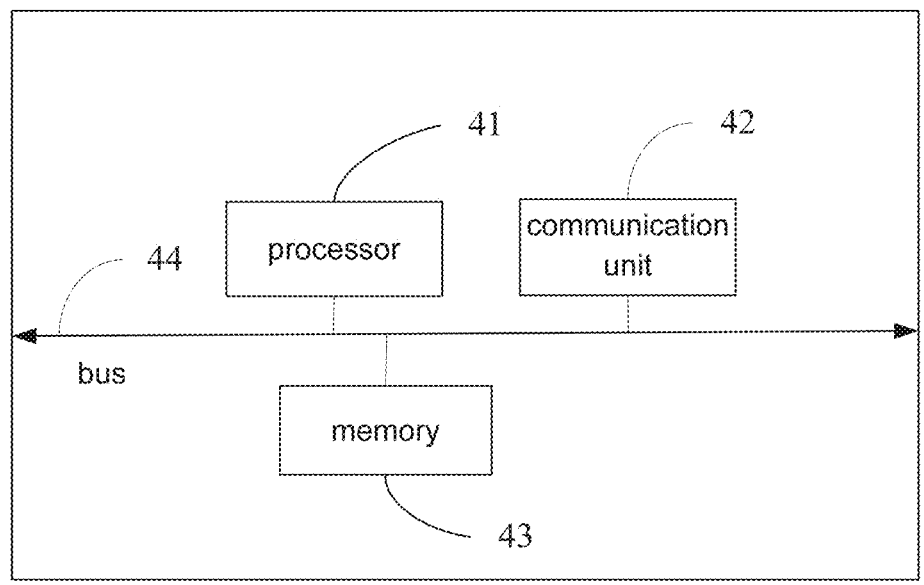
FIG. 4 is a schematic structural diagram of an electronic equipment provided by an embodiment of the present disclosure.

In the case of using an integrated unit, FIG. 4 shows a possible structure diagram of the electronic equipment involved in the above embodiments. The electronic equipment 40 includes a processor 41. The processor 41 is configured to execute the steps performed by the obtainer 31, the classifier 32, the normalization processor 33, and the display 34 and/or to the other processes configured for performing the techniques described herein. The electronic equipment may further include a communication unit 42, a memory 43, and a bus 44. Wherein, the communication unit 42 is configured to support communication between the electronic equipment and other devices. The memory 43 is configured to store program codes and data of the electronic equipment.

The above-described processor 41 may implement or perform various exemplary logic blocks, modules and circuits described in conjunction with the present disclosure. The processor or controller may be a central processing unit, a general purpose processor, a digital signal processor, an application specific integrated circuit, a field programmable gate array or other programmable logic device, a transistor logic device, a hardware component, or any combination thereof. It can implement or perform various exemplary logic blocks, modules, and circuits described in connection with the present disclosure. The processor may also be a combination that implements computing functions, for example, including one or more microprocessor combinations, and the like.

The communication unit 42 may be a transceiver, a transceiver circuit, or a system interface and the like in the electronic equipment.

The memory 43 may include volatile memory such as random access memory; the memory may also include non-volatile memory such as read only memory, flash memory, hard disk, or solid state disk; the memory may also include a combination of the above memory.

The bus 44 may be an Extended Industry Standard Architecture (EISA) bus or the like. Bus 44 may be divided into an address bus, a data bus, a control bus, and the like. For ease of representation, only one bold line is shown in FIG. 4, but not only one bus or one type of bus.

The same or similar parts among the embodiments in this specification may be referred to each other, and each embodiment focuses on the differences from other embodiment. In particular, the description of the apparatus embodiment is relatively simple since it is basically similar to the method embodiments, and reference may be made to the description of the method embodiments for the relevant part.

The embodiment of the present disclosure provides a computer readable storage medium having computer programs stored thereon, and the computer programs is loaded on a computer and executed by the computer to cause the computer to execute the above two-dimensional code processing method.

Wherein, a computer readable storage medium may be such as, but not limited to, an electrical, magnetic, optical, electromagnetic, infrared, or semiconductor system, apparatus, or device, or any combination of the above. More specific examples (a non-exhaustive list) of computer-readable storage media include: an electrical connection having one or more wires, a portable computer diskette, a hard disk, a random access memory (RAM), a read only memory (ROM), an Erasable Programmable Read Only Memory (EPROM), an optical fiber, a Compact Disc Read-Only Memory (CD-ROM), an optical memory Piece, a magnetic memory device, or any suitable combination of the foregoing. In embodiments of the present disclosure, the computer readable storage medium may be any tangible medium that includes or stores a program, which can be used by or in combination with an instruction execution system, apparatus, or device.

An embodiment of the present disclosure further provides a computer program product which, when executed by a processor, performs the method of data display as described in the above embodiments.

The above embodiments are merely illustrative embodiments for the purpose of illustrating the principles of the disclosure, but the disclosure is not limited thereto. It will be apparent to those skilled in the art that various changes and modifications can be made therein without departing from the spirit and essence of the disclosure, which are also considered to be within the scope of the disclosure.

Additional embodiments including any one of the embodiments described above may be provided by the disclosure, where one or more of its components, functionalities or structures is interchanged with, replaced by or augmented by one or more of the components, functionalities or structures of a different embodiment described above.

What is claimed is:

1. An apparatus of data display, comprising:
an obtainer, configured to obtain a plurality of eigen data of a product, wherein the eigen data refer to the data representing the characteristics of the product itself;
a classifier, configured to classify a plurality of eigen data obtained by the obtainer;
an normalization processor, configured to perform different normalization processes on the eigen data classified by the classifier according to the classifications, wherein the normalization processes refer to eliminating the dimension features between the eigen data so as to make the eigen data comparable;
a display, configured to graphically display the eigen data processed by the normalization processor.

2. The apparatus according to claim 1, wherein, the classifications comprise: quantifiable parameter, attributed and non-quantifiable parameter, and non-attributed and non-quantifiable parameter; wherein,
the quantifiable parameter refers to a parameter whose characteristic can be directly represented by a specific numerical value;
the attributed and non-quantifiable parameter refers to a parameter whose characteristic cannot be directly represented by a specific numerical value, but can be represented by a numerical value gotten by general data processing; and
the non-attribute non-quantifiable parameter refers to a parameter whose characteristic neither can be directly represented by a specific numerical value nor can be represented by a numerical value gotten by general data processing.

3. The apparatus according to claim 2, wherein, the normalization processor is configured to:
use a standardized normalization process or a zero-mean normalization process to process the quantifiable parameter;
use a Min-Max normalization process to process the attributed and non-quantifiable parameter; and
use a qualitative normalization process to process the non-attributed and non-quantifiable parameter.

4. The apparatus according to claim 3, wherein, the normalization processor is configured to:
in the case of using the standardized normalization process, determine a first value of the quantifiable parameter, then according to the formula $$y_i = \frac{x_i}{\sum_{1}^{n} x_i^2},$$

process the first value of the quantifiable parameter to obtain a second value of the quantifiable parameter, where $x_i$, is the first value of the quantifiable parameter, $y_i$, is the second value of the quantifiable parameter, i is a natural number greater than or equal to 1 and less than or equal to n, and, n is the number of data of the sample where the first value is and which is a natural number greater than 1;

in the case of using the zero-mean normalization process, determine a first value of the quantifiable parameter, then according to the formula $$y_i = \frac{x_i - \bar{x}}{s},$$

process the first value of the quantifiable parameter to obtain a second value of the quantifiable parameter, where $x_i$ is the first value of the quantifiable parameter, $y_i$ is the second value of the quantifiable parameter, $\bar{x}$ is the mean of all the data in the sample where the first value is, s is the standard deviation of all data of the sample where the first value is, i is a natural number greater than or equal to 1 and less than or equal to n, and, n is the number of data of the sample where the first value is and which is a natural number greater than 1;

in the case of using the Min-Max normalization process, determine a first value of the attributed and non-quantifiable parameter, then according to the formula $$y_i = \frac{x_i - \min\{x_j\}}{\max\{x_j\} - \min\{x_j\}},$$

process the first value of the attributed and non-quantifiable parameter to obtain a second value of the attributed and non-quantifiable parameter, where $x_i$ is the first value of the attributed and non-quantifiable parameter, $y_i$ is the second value of the attributed and non-quantifiable parameter, $\max\{x_j\}$ is the maximum value of all the data in the sample where the first value is, $\min\{x_j\}$ is the minimum value of all the data in the sample where the first value is, i is a natural number greater than or equal to 1 and less than or equal to n, j is a natural number greater than or equal to 1 and less than or equal to n, and, n is the number of data of the sample where the first value is and which is a natural number greater than 1;

in the case of using the qualitative normalization process, divide the interval from 0 to 1 into at least two nodes, set each of the at least two nodes represents a different meaning and each node to a different value, and determine the meaning of the non-attributed and non-quantifiable parameter first, then according to the meaning, obtain which node the non-attributed and non-quantifiable parameter is located, so as to obtain the value corresponding to the node.

5. The apparatus according to claim 1, wherein, the display is configured to:

display a graphic graphified by the processed eigen data on the appearance or package of the product; or transmit the processed eigen data to a display screen so as to display a graphic graphified by the processed eigen data on the display screen.

\* \* \* \* \*